United States Patent Office 3,199,493
Patented Aug. 10, 1965

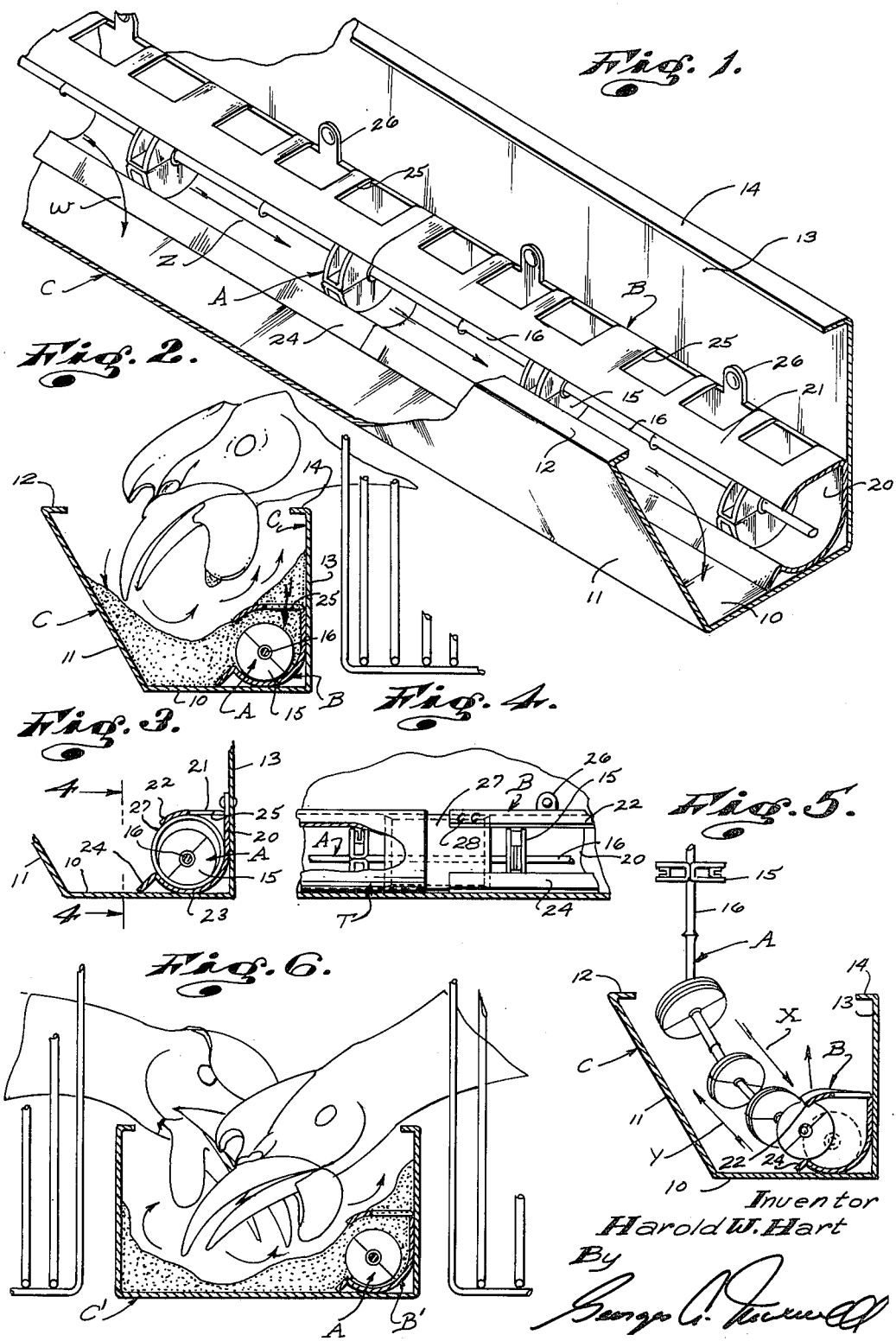

3,199,493
POULTRY FEEDER
Harold W. Hart, P.O. Box 3456, Glendale, Calif.
Filed Aug. 21, 1962, Ser. No. 218,253
9 Claims. (Cl. 119—52)

This invention relates to an improved poultry feeder and is more particularly concerned with a feeding trough with an improved feed-conveying and flow-controlling means related thereto.

It has been common practice in the poultry industry to provide rows of poultry cages in side-by-side relationship, to provide elongate feed troughs adjacent to and extending longitudinally of said rows of cages, and to provide drag-chain type conveyers, or the like, in the troughs to draw feed deposited at one end of the troughs longitudinally therethrough for distribution of said feed throughout the troughs and to the adjacent cages.

Due to the natural propensity for poultry to peck at, or bill, their feed, the above method and apparatus for for feeding poultry has proved unsatisfactory, except for extremely short runs, as the poultry at the inlet end of the troughs, by their billing at the feed, cause the feed to build up at and over the sides of the troughs, bridging the conveyer and spilling from the trough. As a result, considerable feed is wasted and it is not evenly distributed to the discharge end portion of the troughs, with the result that the poultry at the said discharge end portions of the troughs are not properly fed.

Another disadvantage in the general set-up above set forth resides in the fact that chicks, or small, young fowl, will get into the troughs, become caught in the conveyer or chain, and be destroyed.

Attempts have been made to overcome the above problems by providing upwardly opening trough-like shields about the conveyer chains to prevent the poultry from taking all of the feed therefrom, prevent the poultry from being caught in the chain, and to allow feed billed on top of the shields to drop back into engagement with the conveyers and thereby be conveyed down or along the troughs. Apertures are provided in the sides of the shields to discharge and distribute the feed in the troughs.

The above attempts to overcome the noted disadvantages in the basic poultry feeding set-up have met with limited success, as the provision of an upwardly opening shield does not prevent the building up of feed in such a manner as to bridge the opening, because the opening must be small enough to prevent the poultry from inserting their beaks and/or heads therethrough in such a way as to be caught and injured or sheared off by the conveyer.

Further, such attempts, involving upwardly opening shields about the conveyers, necessitate that the top portion of the conveyer most accessible to the poultry be exposed and unprotected.

While the above means serves to shield the conveyer from the poultry at the inlet end of the trough where there is sufficient feed, they tend to become mere traps at the opposite or other ends of the feeding troughs where feed is less abundant and the poultry must get into the shields to obtain the feed.

An object of the present invention is to provide an improved means for guiding and retaining a conveyer chain in a poultry feed trough and to control and establish uniform flow and distribution of feed throughout the longitudinal extent of the trough.

Another object of this invention is to provide a means of the character referred to which is such that poultry will not become caught in the conveyer chain.

Still another object of this invention is to provide a means of the character referred to wherein the chain is contained so as to prevent its displacement and is shielded at its top, throughout its entire longitudinal extent.

A further object is to provide a construction wherein a laterally-opening channel-like chain-receiving and guiding and flow-controlling insert is arranged in the lower forward corner of a conventional poultry feeding trough to extend longitudinally thereof.

It s a further object of the present invention to provide a structure of the character referred to wherein the insert is provided with a rearwardly opening feed distributing openings and a plurality of upwardly opening inlet openings to freely receive feed billed above the insert by the poultry.

It is another object of my invention to provide a structure of the character referred to wherein the feed distributing opening is less in width than the cross-sectional extent of the chain, whereby the chain is enclosed, but is such that the chain can, as a result of the inherent resiliency of the insert, be easily and conveniently snapped into and out of engagement in the insert through said opening.

It is a further object to provide a construction of the character referred to wherein the conveyer chain is visible and accessible from the top of the trough to provide easy and convenient inspection and service thereof.

The various objects and features of my invention will be fully understood from the following detailed description of a typical preferred form and application of my invention, throughout which description reference is made to the accompanying drawings, in which:

FIG. 1 is an isometric view of a portion of a trough, as provided by the present invention;

FIG. 2 is a transverse, sectional view of my new construction;

FIG. 3 is a detailed transverse sectional view of a portion of the construction shown in FIG. 1;

FIG. 4 is a longitudinal sectional view taken as indicated by line 4—4 on FIG. 3;

FIG. 5 is a transverse sectional view of a portion of my new construction showing the conveying chain partially engaged therein; and FIG. 6 is a transverse sectional view of another or modified installation of my new conveyor guide insert.

The present invention is concerned with the provision of a feed conveyor chain A and a chain-retaining and guiding, and feed-flow and distributing insert B, in a conventional poultry feed trough C. The feed trough C is an elongate, horizontally-disposed sheet metal structure having a flat bottom 10, a forwardly and upwardly-inclined rear wall 11, remote from the side of the trough at which the poultry are arranged and provided with a forwardly turned flange 12 at its upper edge, a flat, vertically-disposed front wall 13 with a rearwardly turned flange 14 along its upper edge, adjacent to which the poultry are arranged.

In practice, the trough C is made up of a plurality of sections suitably secured together in end-to-end relationship and is closed at its ends by suitable sheet metal closures, not shown.

The trough C, in accordance with common practice, is arranged with the forward wall adjacent and extending longitudinally of a row of poultry cages so that poultry within the cages can freely feed therefrom.

The conveyor chain A that I provide is an old standard product, well-known in and widely used throughout the poultry industry.

The chain A includes generally, a plurality of longitudinally-spaced disc-shaped couplers 15 and elongate links 16 pivotally connected with and extending between the couplers. The couplers 15 are made up of a pair of semi-circular U-shaped sections pot welded together and are provided with tie members between the semi-circular legs of the U-shaped members to reinforce the units. The links 16 project through central openings in the couplers and through suitable washers within the couplers and are provided at their ends with retainer heads to occur within the couplers and bear against the washers.

Since the particular chain construction is old and well-known, further detailed description thereof is not necessary and will be dispensed with. It will suffice to say that the chain is an articulated construction and that the disc-shaped couplers serve to engage and draw feed, in which the chain is engaged, along.

The insert B that I provide is a simple sheet metal structure having a flat vertically disposed front wall 20, a flat horizontally disposed top wall 21 with a downwardly turned lip 22 along its rear edge, and a downwardly, forwardly and upwardly-curved bottom wall 23 with a rearwardly and downwardly-inclined lip 24 along its rear edge.

The inside vertical and lateral extent of the insert is considerably larger than the diametric extent of the chain couplers 15 so that the chain extends freely through the insert when the construction is in operation, as clearly illustrated in FIGS. 1–4 of the drawings.

The upper rear edge portion of the bottom wall 23 and the lip 22 on the top wall 21 of the insert normally overlie the rear side of and retain the chain A in the insert B.

The distance between the upper rear edge of the bottom wall 23 and the lower rear edge of the lip 22 is slightly less than the diametric extent of the chain couplers 15 and while serving to normally retain the chain against rearward lateral shifting and displacement, are such that they can, by virtue of the inherent resiliency in the top wall 21, be separated by the exertion of moderate manual force on the chain, either laterally, rearwardly and upwardly or laterally, forwardly and downwardly, as indicated by the arrows X and Y in FIG. 5 of the drawings, to snap the chain into and out of engagement in the insert, as circumstances require.

The lower rear edge of the lip 24 on the bottom wall 23 terminates on a horizontal plane tangential with the bottom wall 10, as clearly shown in the drawings.

The top wall 21 of the insert is provided with a plurality of longitudinally-spaced upwardly-disposed apertures or windows 25, the forward edges of which are defined by the upper edge of the front wall 20. The apertures 25 are rectanguar in form, are of limited rearward extent and are disposed with their major longitudinal axes extending longitudinally of the insert.

The apertures 25 are established by a suitable punching operation and can be arranged in equally-spaced relationship, in spaced groups or series, as shown, or in any other desired or suitable arrangement.

In practice, and as illustrated, the front wall 20 is provided with longitudinally-spaced upwardly projecting vertically-disposed apertures mounting tabs 26. The tabs 26 occur at certain of the apertures 25 and are established of the stock removed from the top wall 21 in establishing the related apertures 25.

The insert, like the trough, is made up of a plurality of sections arranged in fixed, butted end-to-end relationship. One end of each end section of insert is provided with a coupling tube 27 equal in outside diametric extent with the inside diameter of the said bottom wall 23 and lip 22. The tube 27 is slidably engaged in said one end of its related section to project axially therefrom and is fixed therein as by welding 28. The other end of the tube slidably enters the opposing end or opening in of a guide tube T, corner pulley housing or other related equipment, as clearly illustrated in FIGS. 3 and 4 of the drawings.

The ends of the insert can extend through the sheet metal closures at the ends of the trough in any suitable manner. Since this detail can vary widely and does not affect the novelty of the present invention, I have chosen not to illustrate it and will not burden this specification with further detailed discussion thereof.

The insert, as illustrated throughout the drawings, is arranged in the lower forward corner of the trough with its front wall 20, bottom wall 23 and lower rear edge of the lip 24 in bearing engagement on the front and bottom walls 13 and 10 of the trough.

The insert is held in fixed position in the trough by means of suitable screw fasteners or rivet-type fasteners 29 engaged through the tabs 26 and front wall 13 of the trough.

In operation, the chain A is driven or drawn through the insert B in the direction indicated by the arrows Z in FIG. 1 of the drawings. As the chain is advanced, the couplers 15 draw feed longitudinally through the insert. As the feed is thus advanced through the insert, it flows and is urged forwardly outwardly through the open rear side of the insert and into the lower rear portion of the trough as indicated by the arrows W in FIG. 1 of the drawings. As the poultry feed from this feed, it is billed and thrown upwardly towards the front wall 13 of the trough, as indicated by the arrows T in FIG. 2 of the drawings. The feed thus cast or billed drops downwardly in the forward lower portion of the trough onto the top of the insert C and through the apertures 25 to be re-engaged by the conveyor and conveyed further, as indicated by the arrows W is FIG. 1 of the drawings.

The apertures 25 are of such size and are in such close proximity to the front wall 13 and are so disposed that the poultry cannot insert their beaks therethrough.

The open rear side of the insert is of sufficiently restricted size and sufficiently shielded by the lip 22 as to prevent small poultry from entering the insert or getting a wing or other part of their body therein and is such that should a bird get its beak therein, there are no cross members or the like thereacross that could catch and stop the advancing of the bird's beak or head, by a coupler 15 and result in shearing off or injuring the bird.

In practice, other means, not a part of the instant invention are employed to drive the chain, guide it about or around corners and to supply the construction with feed. Since these means are standard equipment, well-known in the poultry art, illustration and detailed description thereof can be dispensed with.

In FIG. 6 of the drawings, I have illustrated a modified installation of my new insert.

In this modification the insert is engaged in and along one lower corner of an upwardly opening trough C', rectangular in cross-section, adapted to be engaged between two parallel rows of poultry cages and such that poultry feed from both sides of the trough. In such an installation, feed deposited in the trough C' is billed laterally of the trough in both directions by the poultry and is maintained substantially level therein.

As a result of the above effect of billing of the feed, the problem of building up and spilling of the feed from one side, that is, the front side of the trough, is substantially eliminated.

In all other respects and for all other purposes the insert B' in FIG. 6 of the drawings is the same as in the first above mentioned form and installation of the invention.

It will be apparent from the foregoing that I have invented an improved, easy and economical to manufacture means for feeding poultry which eliminates the major problems previously experienced in similar constructions and a means which is such that it allows for easy and convenient inspection and maintenance of the conveyor chain.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A poultry feed-conveying, distribution and flow-control means engageable in a feed trough having a bottom, forward wall and back wall, including an elongate insert arranged in the lower forward corner of the trough and having a horizontally-disposed apertured top wall with a rearwardly and downwardly-turned lip, a front wall engaged on the front of the trough, a bottom wall adjacent the bottom wall and having an upwardly-projecting rear portion and a rearwardly and downwardly-inclined lip on the upper rear edge of the bottom wall engaging the bottom wall, and an elongate articulated conveyor chain arranged in the insert to extend longitudinally therethrough and adapted to draw feed longitudinally therethrough, urge said feed through the open rear side of the insert, defined by the upper rear edge of the lip on the top wall and the rear edge of the bottom wall, into the trough and to engage and move feed deposited in the insert through the apertures in the top wall.

2. A poultry feed-conveying, distribution and flow-control means engageable in a feed trough having a bottom, forward wall and back wall, including an elongate insert arranged in the lower forward corner of the trough and having a horizontally-disposed apertured top wall with a rearwardly and downwardly-turned lip, a front wall engaged on the front of the trough, a bottom wall adjacent the bottom wall and having a rearwardly and upwardly-projecting rear portion and a rearwardly and downwardly-inclined lip on the rear edge of the bottom wall engaging the bottom wall, and an elongate articulated conveyor chain arranged in the insert to extend longitudinally therethrough and adapted to draw feed longitudinally therethrough, urge said feed through the opening in the rear, defined by the upper rear edge of the lip and the rear edge of the top wall and to engage and move feed deposited in the insert through the apertures in the top wall, said opening in the trough being less in lateral extent than the cross-sectional extent of the chain.

3. A poultry feed-conveying, distribution and flow-control means engageable in a feed trough having a bottom, forward wall and back wall, including an elongate insert arranged in the lower forward corner of the trough and having a horizontally-disposed apertured top wall with a downwardly-turned rear lip, a front wall engaged on the forward of the trough, a bottom wall adjacent the bottom wall and having a rearwardly and upwardly-projecting rear portion and a rearwardly and downwardly-inclined lip on its rear edge engaging the bottom wall, and an elongate articulated conveyor chain arranged in the insert to extend longitudinally therethrough and adapted to draw feed longitudinally therethrough, urge said feed through the opening in the rear, defined by the upper rear edge of the lip and the lower rear edge of the top wall, and to engage and move feed deposited in the insert through apertures in the top wall, said opening in the trough being less in lateral extent than the cross-sectional extent of the chain, said front wall being resilient so that the lip thereon normally yieldingly overlies and retains the forward portion of the chain.

4. A poultry feed-conveying, distribution and flow-control means engageable in a feed trough having a bottom, forward wall and back wall, including an elongate insert arranged in the lower forward corner of the trough and having a horizontally-disposed apertured top wall with a rearwardly and downwardly-turned lip, a front wall engaged on the front of the trough, a bottom wall adjacent the bottom wall and having an upwardly-projecting rear portion and a rearwardly and downwardly-inclined lip on the upper rear edge of the bottom wall engaging the bottom wall, and an elongate articulated conveyor chain arranged in the insert to extend longitudinally therethrough and adapted to draw feed longitudinally therethrough, urge said feed through the open rear side of the insert, defined by the upper rear edge of the lip on the top wall and the rear edge of the bottom wall, into the trough and to engage and move feed deposited in the insert through the apertures in the top wall, said opening in the trough being less in lateral extent than the cross-sectional extent of the chain, said top wall being resilient so that the lip thereon normally yieldingly overlies and retains the upper rear portion of the chain, said insert having flat upwardly-projecting apertured mounting tabs engaging and fixed to the forward wall of the trough by suitable fasteners.

5. A poultry feed-conveying, distributing and flow-control means engageable in a feed trough having a bottom, a forward wall and a back wall, including an elongate insert arranged in the lower forward corner of the trough to extend longitudinally thereof and having a flat horizontally-disposed top wall with a downwardly-turned rear lip, a flat vertically-disposed rear wall engaged on the back of the trough, a downwardly rearwardly and then upwardly-curved bottom wall adjacent the bottom wall and having a rearwardly and downwardly-inclined lip on the upper rear edge thereof and engaging the bottom wall, said top wall having a plurality of longitudinally-spaced upwardly opening rectangular apertures adjacent the front wall, and an elongate articulated conveyor chain arranged in the insert to extend longitudinally thereof and adapted to draw feed longitudinally therethrough, urge said feed through the opening in the rear thereof, defined by the upper rear edge of the said lip and the lower rear edge of said top wall, and to engage and move feed deposited in the insert through the apertures in the top wall.

6. A poultry feed-conveying, distributing and flow-control means engageable in a feed trough having a bottom, a forward wall and a back wall, including an elongate insert arranged in the lower forward corner of the trough to extend longitudinally thereof and having a flat horizontally-disposed top wall with a downwardly-turned rear lip, a flat vertically-disposed rear wall engaged on the back of the trough, a downwardly rearwardly and then upwardly-curved bottom wall adjacent the bottom wall and having a rearwardly and downwardly-inclined lip on the upper rear edge thereof and engaging the bottom wall, said top wall having a plurality of longitudinally-spaced upwardly opening rectangular apertures adjacent the front wall, and an elongate articulated conveyor chain arranged in the insert to extend longitudinally thereof and adapted to draw feed longitudinally therethrough, urge said feed through the opening in the rear thereof, defined by the upper rear edge of the said lip and the lower rear edge of said top wall, and to engage and move feed deposited in the insert through the apertures in the top wall, said chain including a plurality of longitudinally-spaced disc-shaped feed-engaging couplers and elongate links pivotally connected with and extending between the couplers.

7. A poultry feed-conveying, distributing and flow-control means engageable in a feed trough having a bottom, a forward wall and a back wall, including an elongate insert arranged in the lower forward corner of the trough to extend longitudinally thereof and having a flat horizontally-disposed top wall with a downwardly-turned rear lip, a flat vertically-disposed rear wall engaged on the back of the trough, a downwardly rearwardly and then upwardly-curved bottom wall adjacent the bottom wall and having a rearwardly and downwardly-inclined lip on the upper rear edge thereof and engaging the bottom wall, said top wall having a plurality of longitudinally-spaced upwardly opening rectangular apertures adjacent the front wall, and an elongate articlated conveyor chain arranged in the insert to extend longitudinally thereof and adapted to draw feed longitudinally therethrough, urge said feed through the opening in the rear thereof, defined by the upper rear edge of the said lip and the lower rear edge of said top wall, and to engage and move feed deposited in the insert through the apertures in the top wall, said chain including a plurality of longitudinally-spaced disc-shaped feed-engaging couplers and elongate links pivotally connected with and extending between the couplers, the opening in the rear of the insert being less in lateral extent than the diametric extent of the chain couplers.

8. A poultry feed-conveying, distributing and flow-control means engageable in a feed trough having a bottom, a forward wall and a back wall, including an elongate insert arranged in the lower forward corner of the trough to extend longitudinally thereof and having a flat horizontally-disposed top wall with a downwardly-turned rear lip, a flat vertically-disposed rear wall engaged on the back of the trough, a downwardly rearwardly and then upwardly-curved bottom wall adjacent the bottom wall and having a rearwardly and downwardly-inclined lip on the upper rear edge thereof and engaging the bottom wall, said top wall having a plurality of longitudinally-spaced upwardly opening rectangular apertures adjacent the front wall, and an elongate articulated conveyor chain arranged in the insert to extend longitudinally thereof and adapted to draw feed longitudinally therethrough, urge said feed through the opening in the rear thereof, defined by the upper rear edge of the said lip and the lower rear edge of said top wall, and to engage and move feed deposited in the insert through the apertures in the top wall, said chain including a plurality of longitudinally-spaced disc-shaped feed-engaging couplers and elongate links pivotally connected with an extending between the couplers, the opening in the rear of the insert being less in lateral extent than the diametric extent of the chain couplers, said top wall being resilient so that the lip thereon normally yieldingly overlies and retains the upper rear portion of the chain.

9. A poultry feed-conveying, distributing and flow-control means engageable in a feed trough having a bottom, a forward wall and a back wall, including an elongate insert arranged in the lower forward corner of the trough to extend longitudinally thereof and having a flat horizontally-disposed top wall with a downwardly-turned rear lip, a flat vertically-disposed rear wall engaged on the back of the trough, a downwardly rearwardly and then upwardly-curved bottom wall adjacent the bottom wall and having a rearwardly and downwardly-inclined lip on the upper rear edge thereof and engaging the bottom wall, said top wall having a plurality of longitudinally-spaced upwardly opening rectangular apertures adjacent the front wall, and an elongate articulated conveyor chain arranged in the insert to extend longitudinally thereof and adapted to draw feed longitudinally therethrough, urge said feed through the opening in the rear thereof, defined by the upper rear edge of the said lip and the lower rear edge of said top wall, and to engage and move feed deposited in the insert through the apertures in the top wall, said chain including a plurality of longitudinally-spaced disc-shaped feed-engaging couplers and elongate links pivotally connected with and extending between the couplers, the opening in the rear of the insert being less in lateral extent than the diametric extent of the chain couplers, said top wall being resilient so that the lip thereon normally yieldingly overlies and retains the upper rear portion of the chain, said insert having flat upward-projecting apertures mounting tabs engaging and fixed to front of the trough by suitable screw fasteners.

References Cited by the Examiner

UNITED STATES PATENTS

| | | |
|---|---|---|
| 2,745,381 | Wallace et al. | May 15, 1956 |
| 2,794,421 | Rose et al. | June 4, 1957 |
| 2,827,877 | Hart | Mar. 25, 1958 |
| 2,918,037 | Polley | Dec. 22, 1959 |